Figure 1:
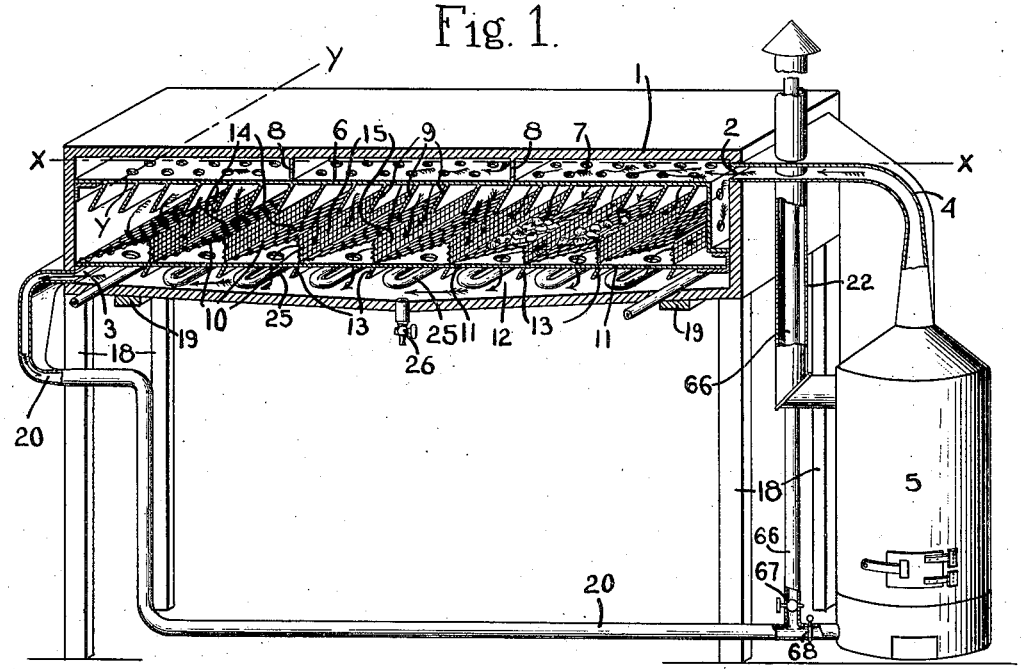

S. J. RAND.
DRYING APPARATUS.
APPLICATION FILED MAR. 19, 1915.

1,149,948.

Patented Aug. 10, 1915.

Witnesses
J. Morrill Fuller
William E. Gagen

Inventor
Silas J. Rand
by Heard, Smith & Tennant,
Att'ys

UNITED STATES PATENT OFFICE.

SILAS J. RAND, OF MANILA, PHILIPPINE ISLANDS.

DRYING APPARATUS.

1,149,948.     Specification of Letters Patent.     Patented Aug. 10, 1915.

Application filed March 19, 1915. Serial No. 15,606.

*To all whom it may concern:*

Be it known that I, SILAS J. RAND, a citizen of the United States, residing at Manila, Philippine Islands, have invented an Improvement in Drying Apparatus, of which the following description, in connection with the accompanying drawing, is a specification, like characters on the drawing representing like parts.

This invention relates to drying apparatus adapted for drying fruits, vegetables, cocoanuts, etc., and has for its object to provide a novel drying apparatus by which articles such as above described may be quickly and rapidly dried, and which is so constructed that the drying currents of air will have access to all parts of each article to be dried, thereby effecting a uniform drying thereof, and otherwise to improve devices of this nature, all as will be more fully hereinafter described and then pointed out in the appended claims.

In order to give an understanding of my invention I have illustrated in the drawings a selected embodiment thereof which will now be described.

Figure 2:
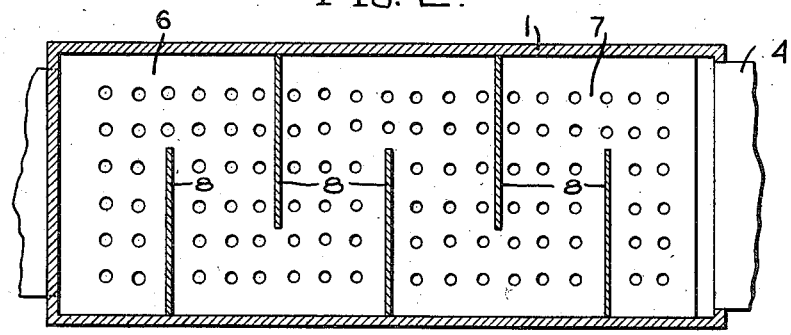
Figure 3:
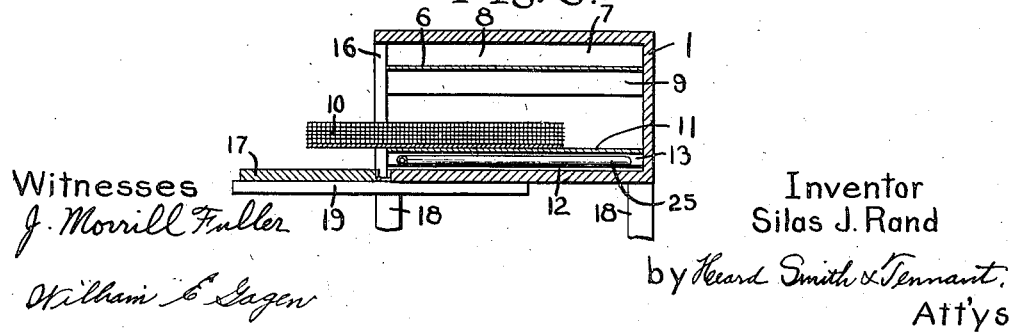

Figure 1 is a sectional perspective view of a drying apparatus embodying my invention; Fig. 2 is a section on the line $x-x$, Fig. 1; Fig. 3 is a section on the line $y-y$, Fig. 1.

The drying apparatus herein illustrated comprises a drying chamber or casing 1 having at its upper side an inlet 2 through which heated air is delivered, and at its lower side an outlet port 3 through which the moisture-laden air is exhausted, the inlet port preferably being at one end of the chamber 1 and the outlet 3 at the opposite end thereof. The inlet 2 is connected by a suitable pipe or conduit 4 with a heater 5 of any suitable construction by which the air to be delivered to the chamber may be heated. Situated within the chamber 1 and extending entirely across from side to side and from one end to the other is a perforated air-distributing plate 6 which is located below the inlet port 2 so that the heated air passing through the port 2 is delivered into the space 7 between the distributing plate 6 and the top of the casing. This distributing plate is provided on its upper side with a plurality of baffle-plates 8 extending from the plate 6 to the top of the casing 1 and providing a tortuous passage for the heated air currents. Secured to the underside of the distributing plate 6 are a plurality of transversely-extending deflecting plates 9, each inclined somewhat, as shown best in Fig. 1, and each extending from one side to the other of the casing 1. The material to be dried, whether in the form of vegetables, fruits, copra or any other article is sustained on a drying rack which will be made of perforated material, preferably of wire netting. This drying rack has a special construction as will be presently described.

Beneath the drying rack 10 and above the outlet port 3 is a second perforated plate 11 which extends across the casing or chamber 1 and through which the air passes into a space 12 immediately above the bottom of the casing or chamber and which communicates with the port 3. This second plate 11 is preferably provided on its under side with inclined deflecting flanges 13.

The drying rack 10 has been especially designed to provide for rapid even drying of the material sustained thereby. This drying rack presents a stepped surface to receive the articles to be dried, such surface presenting the inclined portions 14 and the intermediate vertical portions 15, each vertical portion connecting the upper edge of one inclined portion to the lower edge of the next adjacent inclined portion. Both the inclined and vertical portions 14 and 15 of the drying rack are perforated. The entire rack may be made of wire netting which is bent to present the stepped appearance shown. This rack may rest directly on the perforated plate 11 or may be sustained in the casing in any suitable way. The drying chamber or casing 1 will preferably be provided with an opening 16 in one side through which the rack 10 may be withdrawn, said opening being closed by a suitable door 17 when the device is in operation. The drying chamber 1 is herein shown as mounted on a suitable frame or support 18 which latter has rails 19 extending therefrom on which the rack 10 rests when it is drawn out to receive the copra, as seen in Fig. 3.

The outlet port 3 communicates with a return pipe or conduit 20 which is shown as leading into the heater 5 below the grate thereof whereby the air which is discharged from the drying chamber will be delivered to the heater to support combustion. The pipe 20 has connected thereto a branch pipe 66 which leads up into the flue 22. Said pipe 66 is provided with a damper 67 and the pipe 20 is provided with a damper 68. When the damper 67 is closed all the gas and air passing through the pipe 20 will be delivered to the furnace or heater 5 to support combustion. When it is desired to check the fire, the damper 68 can be closed more or less and the damper 67 opened, thus establishing an outlet from the pipe 20 through the branch pipe 66 into the flue 22. When the damper 68 is opened the draft from the heater 5 will cause a circulation through the pipe 20, and when the damper 68 is closed and the damper 67 is opened the heat in the flue 22 will by heating the pipe 66 maintain proper circulation through the pipe 20.

Means are provided to condense the moisture in the air after it has passed over the fruits, vegetables, or other articles to be dried, and I have found that good results are obtained by placing this condenser in the space 12 immediately beneath the plate 11. This condenser is herein shown as in the form of a condenser coil 25 which is placed in the space 12 and through which a cooling medium may circulate so that as the moisture-laden air comes in contact with the cooling coil the moisture in the air will be condensed. The floor or bottom of the chamber 1 is made slightly inclined so that the water of condensation will flow to the lower portion thereof, and a drip cock 26 is provided for drawing off this water as it accumulates.

In the operation of the device the rack 10 may be withdrawn and the copra, vegetables, fruits, or other material to be dried, may be placed on the inclined portions 14 of the rack, after which the rack may be returned to the chamber 1 and the door 17 closed. The hot air from the heater 5 is delivered through the conduit 4 and port 2 into the chamber 7 above the distributing plate 6, and this heated air will pass through the tortuous passage provided by the baffle-plates 8. As the air cools it will tend to be displaced downward through the plate 6 and its place will be taken by freshly-heated air delivered through the conduit 4. The heating of the air in the return or exhaust pipe 21 by reason of the fact that said pipe passes through the flue 22 will tend to cause a suction in the return pipe which will in turn tend to produce a downward circulation of air through the chamber 1, and this circulatory movement of the air is augmented by the action of the condenser. There will, therefore, soon be established a downward circulation of air in the drying chamber, the heated air passing through the distributing plate 6 at all points and being given an inclined downward direction by the inclined deflecting plates 9. This downward current of air will strike the top and sides of the material resting on the inclined portions 14 of the drying rack. As the air circulates it passes not only downward through the inclined portions 14 of the drying rack, but also through the vertical portions 15, as indicated by the arrows in Fig. 1, and the air which passes through the vertical portions 15 of the drying rack will pass underneath the inclined portions 14 and thus contact with the underside of the fruits, vegetables, or other material. By this means all sides of each piece of material to be dried are subjected to the action of the drying current of air and the result will be an even uniform drying of the material.

In passing over the material to be dried the air will take up moisture from the material, and the moisture-laden air will pass downward through the plate 11 into the chamber 12 where it will come in contact with the condensing coil 25. The action of this coil will be to cool the air and thereby condense the moisture therein which will accumulate in the bottom of the chamber 1. The cooling of the air by the condensing coil serves, of course, to augment the circulation of the air, thus facilitating the drying operation. Although it is not essential that the condenser should be placed in the chamber 5, yet I find that there are advantages in placing it at this point, especially when the device is used for drying copra. The reason for this is that while the outerside of the copra meat can stand considerable heat without being unfavorably affected, yet if the white or inside of the copra meat is subjected to too high a temperature, the tendency is to close the pores on the surface before the moisture is entirely evaporated therefrom. Therefore, it is desirable to have the white or inside of the copra meat subjected to a lower temperature than the outside. By placing the copra meat on the rack 10 with the white side down, this effect can be secured because as the current of air circulates downwardly, it becomes materially cooled when it meets the condensing coil, and this cooling effect modifies the air which is passing underneath the inclined portions 14 of the drying rack. Therefore, if the cocoanut is placed on the drying rack with the outside up and the white or inside down against the rack 10, the temperature of the air which strikes the top or outer side of the nut will be greater than that which has contact with and acts on the under side of the nut and thus the nut will be evenly dried without danger that the pores of the white or inside thereof will be closed before the moisture is entirely evaporated. By this means I find it is possible to satisfactorily dry copra without danger of materially discoloring the white or inside portion thereof.

I claim:

1. In a fruit drier, the combination with a drying chamber having an inlet at its upper side and an outlet at its lower side, of a perforated air-distributing plate extending across the chamber below the inlet, a second perforated plate extending across the chamber above the outlet, a drying rack situated between said plates, a condensing coil beneath the second plate, and means to deliver heated air to the inlet.

2. In a drying apparatus, the combination with a drying chamber having an inlet at its upper side and an outlet at its lower side, of a perforated air-distributing plate extending across the chamber below the inlet, a perforated drying rack situated below said plate and presenting a stepped surface to receive the articles to be dried, said surface presenting alternate inclined and vertical portions, and means to deliver heated air to the inlet.

3. In a drying apparatus, the combination with a drying chamber having an inlet at its upper side and an outlet at its lower side, of a perforated drying rack in said chamber presenting a stepped surface to receive the material to be dried and presenting inclined portions and connecting vertical portions, a condenser beneath said rack, and means to deliver heated air through the inlet.

4. In a drying apparatus, the combination with a drying chamber having an inlet at its upper side and an outlet at its lower side, a perforated air-distributing plate extending across the chamber below the inlet, a drying rack situated below said plate, a heater for heating the air delivered to the inlet and provided with a flue, a return pipe connected with the outlet, said return pipe extending through the flue of the heater whereby the heater serves to deliver heated air to the drying chamber and to assist in establishing circulation through the return pipe.

5. In a drying apparatus, the combination with a drying chamber having an inlet at its upper side and an outlet at its lower side, of a perforated air-distributing plate extending across said chamber below the inlet, inclined deflecting plates depending from the perforated plate, a second perforated plate extending across the chamber above the outlet, a perforated drying rack situated between said plates, a condensing coil beneath the second plate, a heater provided with a flue and connected with the inlet, and a return pipe connected with the outlet and having a portion extending through said flue.

In testimony whereof, I have signed my name to this specification, in the presence of two subscribing witnesses.

SILAS J. RAND.

Witnesses:
L. F. DEE,
J. MORALE.